United States Patent [19]

Silverwater et al.

[11] Patent Number: 4,826,597

[45] Date of Patent: May 2, 1989

[54] FILTER ASSEMBLY WITH REMOVABLE SHEET

[75] Inventors: Bernard F. Silverwater, Plainview, N.Y.; Roydon B. Cooper, New Port Richey, Fla.

[73] Assignee: Pall Corporation, Glen Cove, N.Y.

[21] Appl. No.: 889,522

[22] Filed: Jul. 25, 1986

[51] Int. Cl.$^4$ .............................................. B01D 27/06
[52] U.S. Cl. ................... 210/387; 210/493.4; 210/494.1; 210/497.1; 55/351; 55/487; 55/498
[58] Field of Search ..................... 210/106, 387, 493.1, 210/493.2, 493.4, 493.5, 497.1, 494.1, 497.01; 55/290, 351, 422, 487, 520, 498

[56] References Cited

U.S. PATENT DOCUMENTS

| | | | |
|---|---|---|---|
| 1,764,660 | 6/1930 | Sweetland | 210/317 |
| 2,239,950 | 4/1941 | Berg | 55/447 |
| 2,400,347 | 5/1946 | Goodloe | 210/494.1 |
| 2,463,137 | 3/1949 | Bahlke | 210/493.1 |
| 2,463,723 | 3/1949 | Spraragen | 55/482 |
| 2,522,563 | 9/1950 | Dahlman | 324/95 |
| 2,650,269 | 8/1953 | Webb | 179/185 |
| 2,675,127 | 4/1954 | Layte | 55/498 |
| 2,724,176 | 11/1955 | White | 210/494.1 |
| 2,784,801 | 3/1957 | Lunde | 55/505 |
| 2,860,784 | 11/1958 | Breithaupt | 210/791 |
| 3,143,997 | 8/1964 | Norberg et al. | 116/114 |
| 3,210,229 | 10/1965 | Feine | 210/489 |
| 3,262,578 | 7/1966 | Dennis | 210/494.1 |
| 3,283,904 | 11/1966 | Buckman et al. | 210/493.1 |
| 3,302,796 | 2/1967 | Downey | 210/487 |
| 3,368,687 | 2/1968 | Ruschman | 210/493.1 |
| 3,415,384 | 12/1968 | Kasten | 55/486 |
| 3,417,551 | 12/1968 | Bonell | 210/493.1 |
| 3,488,928 | 1/1970 | Tarala | 55/510 |
| 3,494,114 | 2/1970 | Nelson et al. | 55/498 |
| 3,710,588 | 1/1973 | Martinez | 55/354 |
| 3,884,658 | 5/1975 | Roach | 55/345 |
| 4,033,881 | 7/1977 | Pall | 210/493.2 |
| 4,074,985 | 2/1978 | Wilas | 55/498 |
| 4,172,797 | 10/1979 | Robichaud et al. | 210/493.1 |
| 4,187,136 | 2/1980 | Nostrand | 210/494.1 |
| 4,235,609 | 11/1980 | Garigioli | 55/498 |
| 4,271,025 | 6/1981 | Erdmannsdörfer | 210/493.2 |
| 4,406,787 | 9/1983 | Süto et al. | 210/315 |
| 4,588,464 | 5/1986 | Miyagi et al. | 210/493.2 |
| 4,647,373 | 3/1987 | Tokar et al. | 210/232 |

FOREIGN PATENT DOCUMENTS

| | | |
|---|---|---|
| 727808 | 2/1966 | Canada . |
| 0001407 | 4/1979 | European Pat. Off. . |
| 0024514 | 7/1980 | European Pat. Off. . |
| 1922976 | 11/1979 | Fed. Rep. of Germany . |
| 2414352 | 8/1979 | France . |
| 2577482 | 8/1983 | Japan . |
| 357990 | 10/1931 | United Kingdom . |
| 601918 | 5/1948 | United Kingdom . |
| 725618 | 3/1955 | United Kingdom . |
| 733689 | 7/1955 | United Kingdom . |
| 758329 | 10/1956 | United Kingdom . |
| 1076959 | 7/1967 | United Kingdom . |
| 1263207 | 2/1972 | United Kingdom . |

OTHER PUBLICATIONS

Hackh's Chemical Dictionary, Fourth Edition, Julius Grant, McGraw Hill Book Company, 1969, p. 414.

*Primary Examiner*—Richard V. Fisher
*Assistant Examiner*—Wanda L. Millard
*Attorney, Agent, or Firm*—Leydig, Voit & Mayer

[57] ABSTRACT

The disclosure describes a filter assembly for removing particulates from a fluid. The filter assembly comprises a porous pleated composite and structure for directing fluid flow through the composite. The composite includes upstream and downstream filter media, the upstream filter medium being removably mounted on the surface of the downstream filter medium.

20 Claims, 4 Drawing Sheets

FILTER ASSEMBLY WITH REMOVABLE SHEET

TECHNICAL FIELD

The present invention is directed to a filter assembly and, more particularly, to an improved filter assembly for removing particulates from a fluid flow stream which, for example, facilitates inspection for diagnostic purposes.

DISCLOSURE OF THE INVENTION

Mechanical or chemical systems freqently have fluid flow streams which include one or more filter assemblies for removing particulates from the fluid flow stream. For example, an automobile uses an oil filter for removing harmful particulates from the flow of lubrication oil to prevent the particulates from damaging the automobile engine. In certain cases, particularly when the system is first operated or when a worn part in the system has been replaced by a new part, the fluid flow stream may contain unusually large particulates or an unusually large quantity of particulates because the system or new part requires a certain period of time to "wear in". It would be beneficial to collect and analyze such unduly large and/or abundant particulates since the nature of those particulates may yield information concerning whether the system is operating satisfactorily or a certain malfunction may be about to occur. In addition, it would be beneficial to collect and dispose of a significant portion of the particulates to extend the useful life of the filter element.

Accordingly, the present invention provides a filter assembly for removing particulates from a fluid flowing through the filter assembly, the filter assembly comprising a porous, generally cylindrical, pleated composite and first and second end caps disposed on the ends of the cylindrical composite. The cylindrical composite includes first and second filter media, and the first and second end caps direct fluid flow radially inwardly through the composite first through the first or upstream filter medium and then through the second or downstream filter medium. The first end cap has an outlet for discharging fluid from the filter assembly. The upstream filter medium has a mean pore size which is in the range from about 2 to about 50 times greater than the mean pore size of the downstream filter medium. Further, the upstream filter medium is releasably secured to the downstream filter medium to allow removal of the upstream filter medium without disturbing the downstream filter medium.

The invention also provides a filter assembly comprising first and second porous filter media and first and second end caps. The first porous filter medium is pleated and has a generally cylindrical, hollow configuration. The first end cap encloses one end of the first filter medium and the second end cap caps the other end of the first filter medium. The second porous filter medium is disposed adjacent to and pleated on the first filter medium. The first and second end caps direct fluid flow radially inwardly first through the second or upstream filter medium and then through the first or downstream filter medium, and the second end cap has an outlet aperture communicating with the interior of the downstream filter medium for discharging fluid from the filter assembly. The upstream filter medium has a mean pore size which is in the range from about 2 to about 50 times greater than that of the downstream filter medium. Further, the upstream filter medium is releasably secured to the downstream filter medium to allow removal of the upstream filter medium without disturbing the downstream filter medium.

The filter assembly provided by the present invention is useful for diagnosing problems within the system. Whenever appropriate, at least a portion of the first filter medium can be removed from the filter assembly and analyzed to determine if particulates indicative of a malfunction are present. Furthermore, by removing the first filter medium along with the particulates it retains, the useful life of the filter assembly may be extended.

In order to trap large particulates for analysis, the first filter medium may have a larger mean pore size than the second filter medium, where mean pore size is the average diameter of the pores or flow channels through the filter medium. The larger particulates would then be trapped by the pores of the first filter medium while the smaller particulates would flow through the larger pores of the first filter medium but would be retained by the smaller pores of the second filter medium.

In general, any means for removably mounting the first filter medium on the second filter medium, such as by the use of an adhesive, is within the scope of the present invention. Further, the first filter medium may be provided with perforations to facilitate removal of a substantial portion of the first filter medium. For example, it may be preferable to remove substantially all of the first filter medium after a new mechanical system or a mechanical system with a new part has been operated several times and has become worn in. Alternatively, it may be preferable to remove the first filter medium in sections, e.g., by removing one fourth of the first filter medium after the filter assembly has been in service for a certain length of time, then removing a second quarter of the first filter medium a certain length of time thereafter, and so on. To accomodate such a need, an embodiment in accordance with the present invention may include a first filter medium having perforations arranged to facilitate removal of the first filter medium in sections. Such a filter assembly would facilitate essentially continuous monitoring of the type of particulates in the flow stream.

BEST MODE FOR CARRYING OUT THE INVENTION

Filter assemblies or elements in accordance with the present invention have applicability in a wide variety of mechanical or chemical systems. For example, they are suitable for use in generally any system having a fluid flow stream containing particulates, particularly where the fluid flow stream occasionally contains unusually large particulates, unusually large amounts of particulates, or both. They are also suitable for use in generally any system in which it would be desirable to analyze the particulate flow in a fluid stream passing through the filter element.

Figure 1:
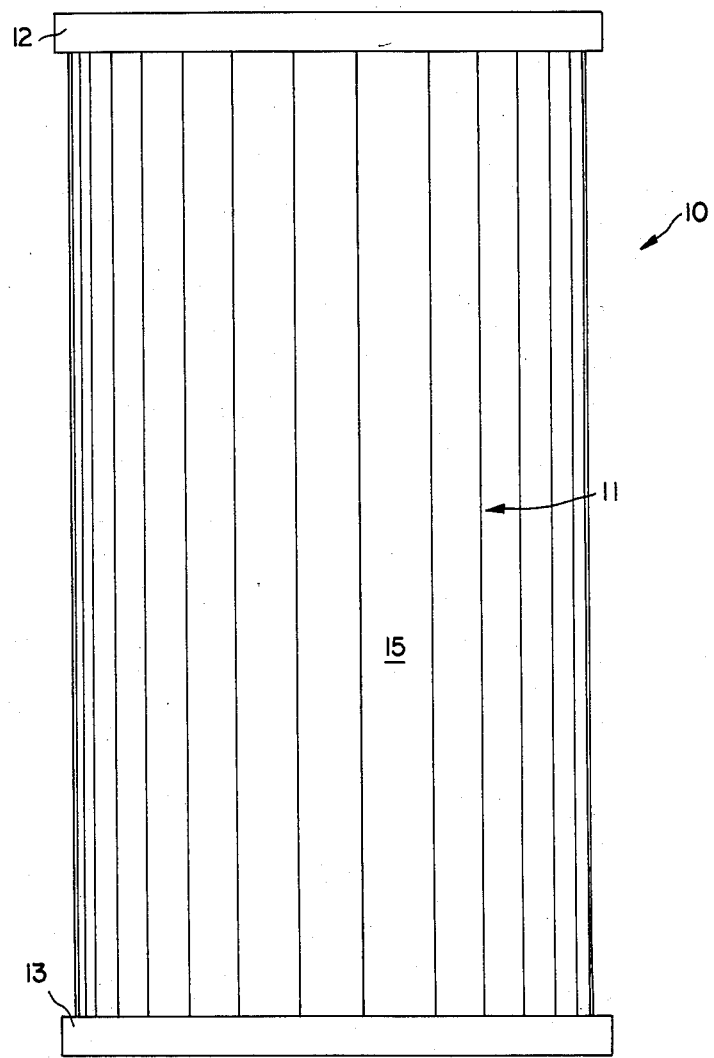
FIG. 1 is an elevation view of a first exemplary filter assembly embodying the present invention.
Figure 2:
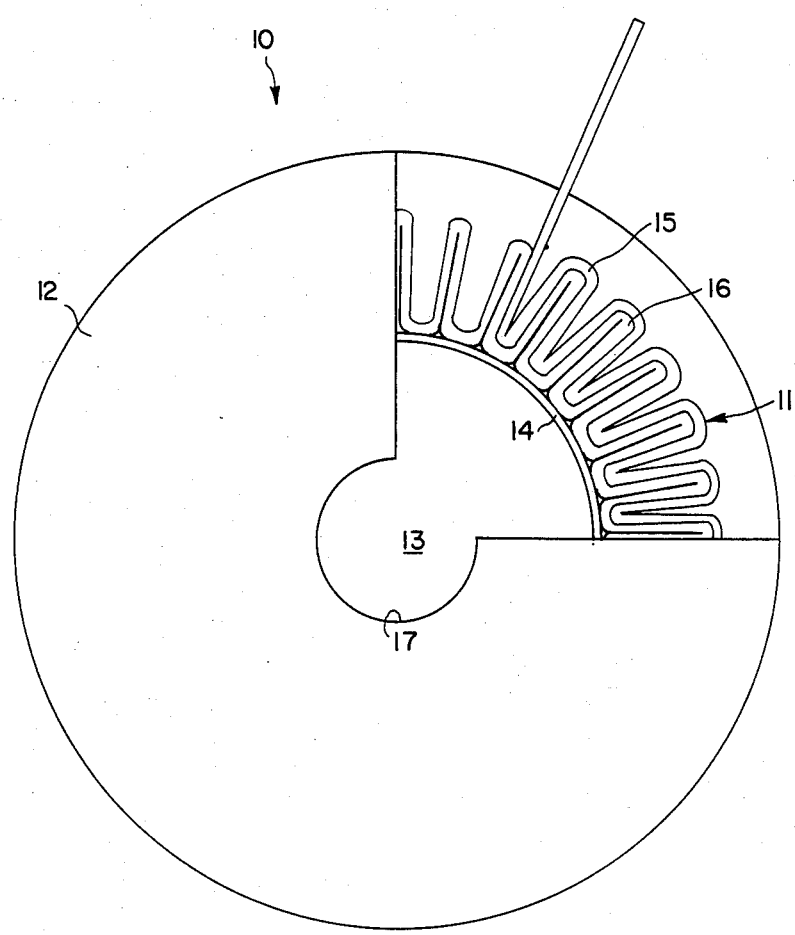
FIG. 2 is a plan view of the exemplary filter assembly showing a portion of the first end cap cut away and a portion of the first filter medium removed from the second filter medium.

As shown in FIGS. 1 and 2, a first exemplary filter element 10 embodying the present invention generally comprises a cylindrical, hollow, pleated porous composite 11 and first and second end caps 12, 13 attached to the ends of the composite 11 for directing fluid radially inwardly through the composite 11. A perforated core 14 extends between the end caps 12, 13 along the inside diameter of the composite 11, supporting the composite 11 against the differential pressure of the inwardly directed fluid. Alternatively, if the composite 11 has sufficient structural integrity to withstand the differential pressure, the core 14 may be omitted.

In accordance with one aspect of the invention, the composite 11 includes an upstream porous filter medium 15 removably mounted on and pleated to a downstream filter medium 16, allowing the upstream filter medium 15 to be separated from the downstream filter medium 16. Both the upstream and downstream filter media 15, 16 may include support and drainage layers to enhance the structural integrity and filtering characteristics of the filter medium.

The upstream filter medium 15 generally comprises any suitable porous structure having sufficient flexibility and structural integrity to be removed from the downstream filter medium 16 without disintegrating. For example, the upstream filter medium may be configured as a depth filter medium such as a high dirt capacity (HDC) medium or a surface filter medium such as a porous membrane It may be formed from a fibrous material, either woven or nonwoven, or a non-fibrous material, and it may be fashioned from any suitable substance including a metal, a glass, or a plastic or a polymer, such as nylon, polypropylene, or a fabric, sheet, or laminate of man-made fibers and filaments available under the registered trademark REEMAY. In the first exemplary filter element 10, the upstream filter medium 15 preferably comprises a calendered nonwoven polymeric medium.

The downstream filter medium 16 may also comprise any suitable porous structure, including a porous structure similar to that of the upstream filter medium 15. Thus, the downstream filter medium 16 may similarly be configured as a depth or surface filter medium, formed from a fibrous or non-fibrous material, or fashioned from a metallic, glass, or polymeric substance. The downstream filter medium 16 may also be fabricated as a more rigid structure than the upstream filter medium 15. For example, the downstream filter medium 16 may be fabricated from a sintered powdered metal and formed into a pleated shape. In the first exemplary filter element 10, the downstream filter medium 16 preferably comprises a fibrous glass resin-bonded medium.

The mean pore size for the upstream and downstream filter media 15, 16 depends on the particular application of the filter element. To remove very small particulates, the downstream filter medium 16 may have a microporous structure, e.g., a mean pore diameter in the range from about 1 to about 10 microns. However, for less demanding applications, the downstream filter medium 16 may have a much greater mean pore diameter.

The mean pore diameter of the upstream filter medium 15 may be sized according to its purpose. If the upstream filter medium 15 is to remove a large quantity of small particulates which are expected to be disposed in the fluid only during a brief period of time, e.g., during an initial start-up or green run, then the mean pore diameter of the upstream filter medium 15 may be as small as that of the downstream filter medium 16. By retaining the large quantity of particulates, the useful life of the downstream filter medium 16 may be extended.

Alternatively, if the upsteam filter medium 15 is to remove only the larger particulates, which may indicate particular mechanical malfunctions, then the mean pore diameter of the upstream filter medium 15 may be greater than that of the downstream filter medium 16. For example, the mean pore diameter of the upstream filter medium 15 may be in the range from about 1.05 to about 50 times greater than that of the downstream filter medium 16. In the first exemplary filter element 10, the mean pore diameter of the upstream filter medium 15 is about 30 times greater than that of the downstream filter medium 16.

The composite 11 may be fashioned in a variety of ways without departing the scope of the invention. For example, where the upstream and downstream filter media 15, 16 are available in sheet form, they may first be overlaid on one another to form the composite 11. The composite 11 may then be pleated and formed into a hollow cylinder by joining opposite lateral edges. During overlaying, the upstream and downstream filter media 15, 16 may be joined in any suitable manner which will allow the upstream filter medium 15 to be removed from the downstream filter medium 16. For example, they may be joined by a weak adhesive or by heat setting, i.e., simultaneously applying heat and pressure to the overlay.

As another example, the composite 11 may be fashioned by first forming the downstream filter medium 16 into a hollow pleated cylinder. The upstream filter medium 15 may then be pleated to the previously fashioned downstream filter medium 16 by wrapping it around and tucking it into the pleats of the downstream filter medium 16. Again, the upstream filter medium 15 may be joined to the downstream filter medium 16, for example, by an adhesive.

The first end cap 12 has a central aperture 17 which, for the first exemplary filter element 10, allows the fluid to exit the filter element 10. The second end cap 13 is a blind end cap. Both the first and second end caps 12, 13 may be fabricated from any suitable impervious material including, for example, a metal, a plastic or polymeric material, or rubber. The perforated core 14 may be fabricated from any suitable material that will provide the necessary structural strength to support the composite 11 against the differential pressure of the fluid including, for example, a metal or a plastic or polymeric material. In the first exemplary filter element 10, the first and second end caps 12, 13 and the perforated core 14 are fabricated from aluminum.

The end caps 12, 13 may be joined to the composite 11 and the core 14 in any suitable manner which seals the end caps 12, 13 to the ends of the composite 11, including, for example, by an adhesive or by a potting material. Alternatively, where the end caps 12, 13, composite 11, and core 14 are each fashioned from a plastic or polymeric material, the end caps 12, 13 may be joined to the composite 11 and core 14 by heat melt sealing, spin bonding, or sonic welding. By sealing the end caps 12, 13 to both the upstream and downstream filter media 15, 16, the end caps 12, 13 aid in maintaining the upstream filter medium 15 mounted to the downstream filter medium 16.

In the preferred mode of operation, the first exemplary filter element 10 may be installed in a housing (not shown) of a mechanical or chemical system. The system may then be operated for a certain period of time, e.g., during an initial start-up or green run, forcing the fluid through the upstream filter medium 15 and then the downstream filter medium 16 of the filter element 10. Since the upstream filter medium 15 is pleated, the surface area and, therefore, the dirt capacity, i.e., the amount of particulate material retained by the filter medium, are greatly enhanced. Once the system is shut down, the filter element 10 may be removed from the housing, and all or only a portion of the upstream filter medium 15 may be removed from the downstream filter medium 16 and inspected. The upstream filter medium 15 may be removed from the downstream filter medium 16 by tearing a small piece away and then pulling the small piece, separating the upstream filter medium 15 from the downstream filter medium 16, as shown in FIG. 2.

If the mean pore diameter of the upstream and downstream filter media 15, 16 are comparable, the upstream filter medium 15 will retain both the large particulates, which may indicate particular malfunctions, and the small particulates, which may be unusually abundant and would otherwise shorten the useful life of the downstream filter medium 16. Alternatively, if the mean pore diameter of the upstream filter medium 15 is greater than that of the downstream filter medium 16, then only the large particles will be retained without substantially effecting the dirt capacity of the downstream filter medium 16. The pressure drop across the composite 11 is also substantially unaffected by an upstream filter medium 15 with a significantly greater mean pore diameter. If only a portion of the upstream filter medium 15 is removed from the downstream filter medium 16, then the filter element 10 may be again installed in the housing. Further portions of the upstream filter medium 15 may be later removed and examined during subsequent maintenance shut-downs to provide a continuing check on the system by means of the retained particles.

Figure 3:
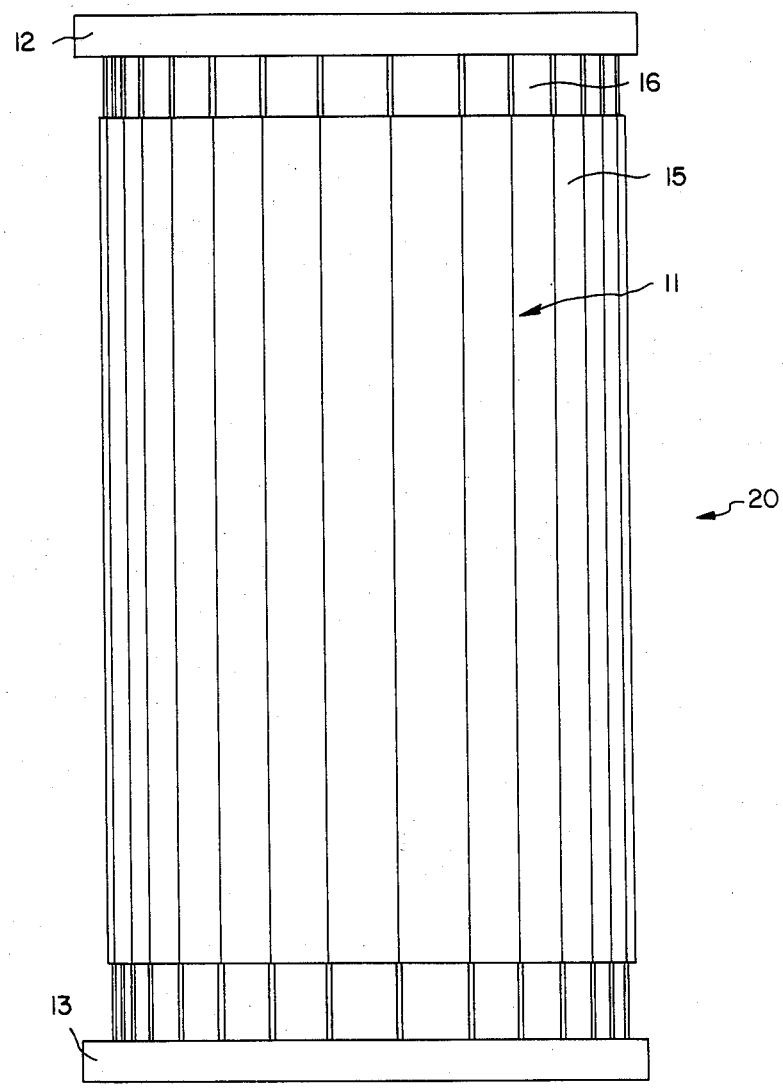
FIG. 3 is an elevation view of a second exemplary filter assembly embodying the present invention.

A second exemplary filter element 20 which embodies the present invention and is especially designed for ease of removal of the upstream filter medium is shown in FIG. 3. The second exemplary filter element 20 may be identical to the first exemplary filter element 10 (identical reference numerals identifying analogous components) except that the composite 11 includes an upstream filter medium 15 which covers only a portion of the downstream filter medium 16. For example, as shown in FIG. 3, the upstream filter medium 15 may be pleated to the downstream filter medium 16 as a wide strip which extends most of the distance between the end caps 12, 13. In the second exemplary filter element 20, the end caps 12, 13 are mounted to the composite 11 only at the ends of the downstream filter medium 16. Since the end caps 12, 13 are not attached to the upstream filter medium 15, it may be preferable to join the upstream filter medium 15 to the downstream filter medium 16 by a mild adhesive.

Figure 4:
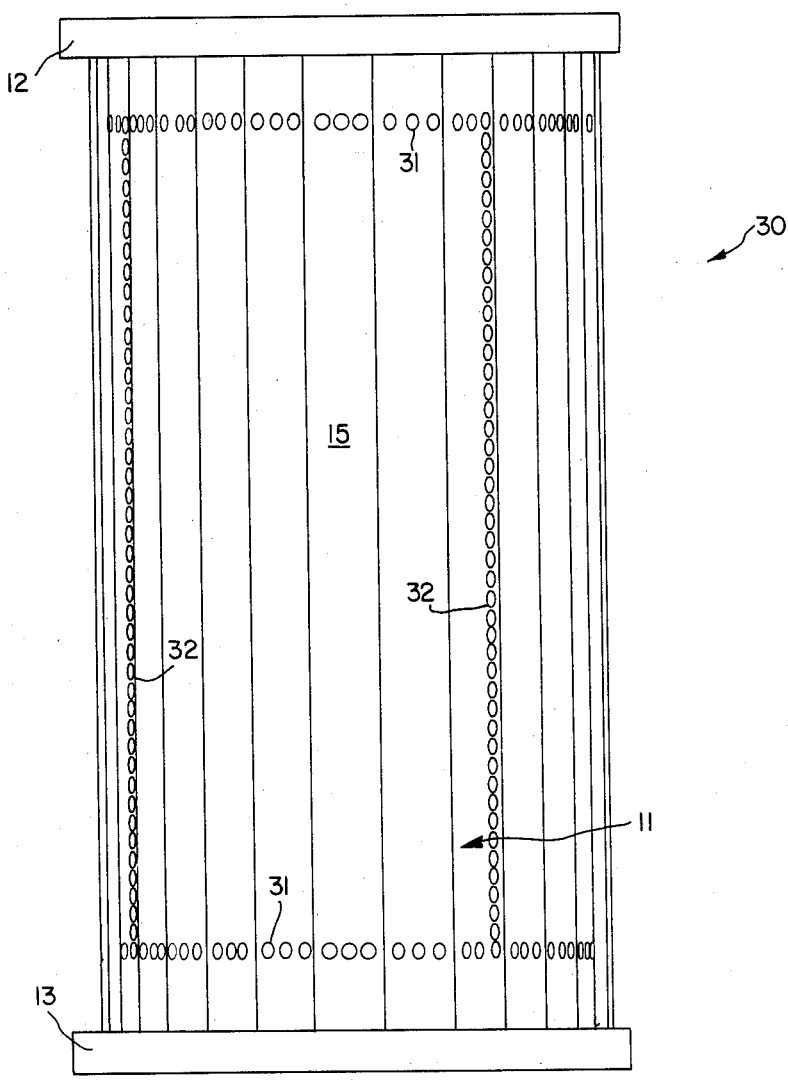
FIG. 4 is an elevation view of a third exemplary filter assembly embodying the present invention.

A third exemplary filter element 30 embodying the present invention is shown in FIG. 4. The third exemplary filter element 30 may be identical to the first exemplary filter element 10 (identical reference numerals identifying analogous components) except that the upstream filter medium 15 includes circumferential perforations 31 which facilitate removal of the upstream filter medium 15. If only a portion of the upstream filter medium is to be removed at any one time, the third exemplary filter element 30 may further include perforations 32 which extend axially between the circumferential perforations 31.

Although the invention has been described in terms of three exemplary embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention.

We claim:

1. A filter assembly for removing particulates from a fluid flowing through the filter assembly, the filter assembly comprising:

a porous, generally cylindrical, pleated composite including first and second filter media;

first and second end caps disposed on the ends of the cylindrical composite for directing fluid flow radially inwardly through the composite, first through the first or upstream filter medium and then through the second or downstream filter medium, the first end cap having means for defining an outlet aperature for discharging fluid from the filter assembly and the upstream filter medium having a mean pore size which is in the range from about 2 to about 50 times greater than the mean pore size of the downstream filter medium; and means for releasably securing the upstream filter medium to the downstream filter medium to allow removal of the upstream filter medium without disturbing the downstream filter medium.

2. The filter assembly according to claim 1 wherein the releasably securing means includes an adhesive.

3. The filter assembly according to claim 2 wherein the upstream filter medium covers only a portion of the surface of the downstream filter medium.

4. The filter assembly according to claim 1 wherein the upstream filter medium is formed of a polymeric material.

5. The assembly according to claim 4 wherein the upstream filter medium is formed of polypropylene, polyethylene, nylon, or a fabric, sheet, or laminate of man-made fibers and filaments available under the registered trademark REEMAY.

6. The filter assembly according to claim 1 wherein the upstream filter medium comprises a nonwoven medium.

7. The filter assembly according to claim 6 wherein the mean pore size of the upstream filter medium is about 50 microns.

8. The filter assembly according to claim 1 wherein the first upstream medium comprises a high dirt capacity medium.

9. The filter assembly according to claim 1 wherein the upstream filter medium comprises a membrane.

10. The filter assembly according to claim 1 wherein the releasably securing means comprises a surface of the upstream filter medium bonded to a surface of the downstream filter medium by heating setting of the upstream filter medium onto the downstream filter medium.

11. The filter assembly to claim 1 wherein the releasably securing means comprises means for joining the upstream and downstream filter media to the first and second end caps.

12. The filter assembly according to claim 1 wherein the upstream filter medium is provided with perforations defining a portion of the upstream filter medium which is adapted to be removed.

13. A filter assembly for removing particulates from a fluid flowing through the filter assembly, the filter assembly comprising:
 a first porous pleated filter medium having a generally cylindrical, hollow configuration;
 a first end cap for enclosing one end of the first filter medium;
 a second end cap for capping the other end of the first filter medium;
 a second porous filter medium disposed adjacent to and pleated on the first filter medium, the first and second end caps directing fluid flow radially inwardly first through the second or upstream filter medium and then through the first or downstream filter medium, the second end cap including means for defining an outlet aperature communicating with the interior of the downstream filter medium for discharging fluid from the filter assembly, and the upstream filter medium having a mean pore size which is in the range from about 2 to about 50 times greater than that of the downstream filter medium; and
 means for releasably securing the upstream filter medium to the downstream filter medium to allow removal of the upstream filter medium without disturbing the downstream filter medium.

14. The filter assembly according to claim 13 wherein the upstream porous filter medium comprises a nonwoven medium.

15. The filter assembly according to claim 14 wherein the mean pore size of the upstream porous filter medium is about 50 microns.

16. The filter assembly according to claim 13 wherein the upstream filter medium is formed of polypropylene, polyethylene, nylon, or REEMAY TM.

17. The filter assembly according to claim 13 wherein the releasably securing means includes an adhesive and the upstream filter medium covers only a portion of the downstream filter medium.

18. The filter assembly to claim 13 wherein the upstream medium comprises a high dirt capacity medium.

19. The filter assembly according to claim 13 wherein the upstream medium comprises a membrane.

20. The filter assembly according to claim 13 wherein the upstream filter medium is provided with perforations defining a portion of the upstream filter medium which is adapted to be removed.

* * * * *